(12) United States Patent
Takami et al.

(10) Patent No.: US 11,065,701 B2
(45) Date of Patent: Jul. 20, 2021

(54) TAP

(71) Applicant: Nachi-Fujikoshi Corp., Tokyo (JP)

(72) Inventors: Shunsuke Takami, Toyama (JP); Yuki Kurita, Toyama (JP)

(73) Assignee: Nachi-Fujikoshi Corp.

( * ) Notice: Subject to any disclaimer, the term of this patent is extended or adjusted under 35 U.S.C. 154(b) by 8 days.

(21) Appl. No.: 16/707,302

(22) Filed: Dec. 9, 2019

(65) Prior Publication Data

US 2020/0114443 A1 Apr. 16, 2020

Related U.S. Application Data

(63) Continuation of application No. PCT/JP2018/022685, filed on Jun. 14, 2018.

(30) Foreign Application Priority Data

Jun. 19, 2017 (JP) .............................. JP2017-119600

(51) Int. Cl.
*B23G 5/06* (2006.01)

(52) U.S. Cl.
CPC ............ *B23G 5/06* (2013.01); *B23G 2200/48* (2013.01); *Y10T 408/904* (2015.01); *Y10T 408/90467* (2015.01)

(58) Field of Classification Search
CPC ...... B23G 5/06; B23G 5/062; B23G 2220/24; B23G 2220/48; Y10T 408/904; Y10T 408/90467; Y10T 408/9048
See application file for complete search history.

(56) References Cited

U.S. PATENT DOCUMENTS

| 9,839,984 B2 * | 12/2017 | Burns ..................... B24B 19/04 |
| 2015/0251261 A1 | 9/2015 | Nakajima |
| 2018/0318949 A1 | 11/2018 | Nakajima |

FOREIGN PATENT DOCUMENTS

| CN | 2325149 Y | * | 6/1999 | |
| DE | 3925506 C1 | * | 1/1991 | ............... B23G 5/06 |
| EP | 0122176 A2 | * | 10/1984 | ............... B23G 5/06 |
| JP | H01-171725 A | | 7/1989 | |
| JP | H11-245119 A | | 9/1999 | |
| JP | 2008-073774 A | | 4/2008 | |
| WO | WO-2014-013549 A1 | | 1/2014 | |
| WO | WO-2017-094152 A1 | | 6/2017 | |

OTHER PUBLICATIONS

Machine Translation, CN 2325149 Y, Jun. 1999. (Year: 1999).*
Machine Translation, DE 3925506 C1, Jan. 1991. (Year: 1991).*

* cited by examiner

*Primary Examiner* — Chwen-Wei Su
(74) *Attorney, Agent, or Firm* — Harness, Dickey & Pierce, P.L.C.

(57) ABSTRACT

A tap 1 has a threaded portion 2 including a cutting blade 5 on an outer circumferential surface, a flute portion 3 that divides the threaded portion 2 in a circumferential direction, and a shank portion 4 formed continuously from the threaded portion 2 and the flute portion 3 along a central axis O. The flute portion 3 includes, in a cross-sectional view, a first flute 31 formed continuously from the cutting blade 5 of the threaded portion 2, a second flute 32 formed continuously from the first flute 31, and a ridge line portion 33 being a boundary between the first and second flutes 31, 32. A distance "e" from the central axis O to the ridge line portion 33 is longer than a distance d1 and a distance d2, respectively.

7 Claims, 6 Drawing Sheets

TAP

CROSS REFERENCE TO RELATED APPLICATION

This application is a continuation of International Patent Application No. PCT/JP2018/022685, having an international filing date of Jun. 14, 2018, which designated the United States, the entirety of which is incorporated herein by reference. Japanese Patent Application No. 2017-119600 filed on Jun. 19, 2017 is also incorporated herein by reference in its entirety.

BACKGROUND ART

The present disclosure relates to a tap for tapping a work material, in particular a titanium alloy or the like.

Typically, for tapping a work material (workpiece) of a steel material or the like, a tap is used in accordance with a nominal diameter and a pitch of a female screw.

Also, the form of the tap used is determined depending on various factors such as a type of work material and the depth of a worked hole for the female screw.

In a case in which the work material is a carbon steel (SC material) or the like, chips generated during tapping become longer than those of other work materials since the SC material or the like is relatively ductile.

As a result, a flute of the tap tends to clog with the chips, reducing chip discharge performance.

In addition, the tap is entangled in the long continuing chips when the tap is rotated inversely and is pulled out of the work material after tapping.

This leads to a problem that abrasion occurs between a worked female threaded portion and a cutting blade portion of the tap and both are damaged.

In response to this problem, a tap is further provided with a sub-flute in addition to a flute (spiral flute) in the related art, in International Publication No. 2014/013549, JP-A-2008-73774, and JP-A-1-171725, for example. In this manner, the chips generated during tapping are divided, thereby improving chip discharge performance and performance at the time of pulling out the tap.

Meanwhile, in a case in which the work material is of a material with relatively low ductility as compared with the steel material, for example, in a case of a titanium alloy or the like, chips are divided into relatively small pieces during tapping.

Therefore, the problem that the chip discharge properties are degraded due to long continuing chips as described above does not occur.

However, divided chips move to a heel side within the flute of the tap when the tap is rotated inversely and is pulled out of the work material after tapping.

As a result, there is a problem that the chips enter a gap between the heel and the work material, sticking (galling) of the chips to the threaded portion are likely to occur, and performance at the time of pulling out the tap is degraded.

SUMMARY OF THE INVENTION

An object of the disclosure is to provide a tap that exhibits an improved performance when the tap is pulled out of a work material after tapping even in a case in which the work material is of a material with relatively low ductility as compared with a steel material and the like, representative examples of which include titanium alloy.

In order to solve the aforementioned problem, a tap according to the present disclosure includes: a threaded portion that has a cutting blade on an outer circumferential surface of the threaded portion; a flute portion that is formed so as to divide the threaded portion in a circumferential direction; a shank portion that is formed continuously from the threaded portion and the flute portion along a central axis, the flute portion, in a cross-sectional view, includes a first flute that is formed continuously from the cutting blade of the threaded portion, a second flute that is formed continuously from the first flute, and a ridge line portion that is a boundary between the first flute and the second flute, and a distance from the central axis to the ridge line portion is longer than a distance from the central axis to a flute bottom of the first flute and is longer than a distance from the central axis to a flute bottom of the second flute.

In this case, the distance from the central axis to the flute bottom of the first flute may be shorter than the distance from the central axis to the flute bottom of the second flute.

Also, the threaded portion can have a leading part and a complete thread part along the central axis. In this case, a clearance angle of the leading part can be less than 2°, and the number of lead threads at the leading part may be equal to or greater than two.

Although the flute portion may be in any of flute forms of a straight flute (straight) and a helical flute (spiral), the flute portion is more preferably in a flute form of a spiral flute.

Utilization of the tap according to the disclosure leads to an effect that biting of the tap due to chips divided after tapping is prevented and performance exhibited when the tap is rotated inversely and is pulled out of a work material is improved, even in a case in which a work material with relatively low ductility, such as titanium alloy, as compared with a steel material is to be tapped.

DESCRIPTION OF EMBODIMENTS

Figure 1:
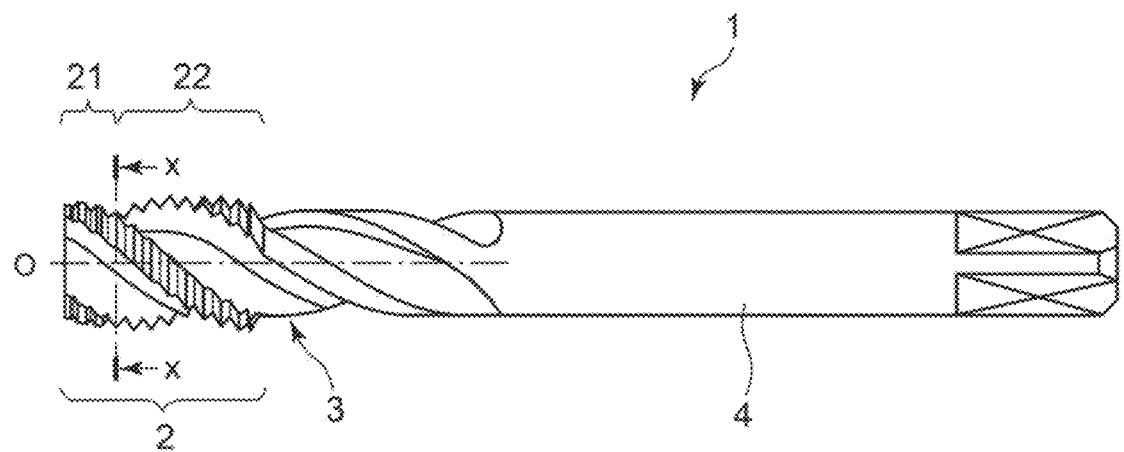
FIG. 1 is a front view of a tap 1 illustrating an embodiment of the disclosure.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

Although an embodiment of a tap according to the disclosure will be described with reference to drawings, the disclosure is not limited thereto.

A front view of a tap 1 illustrating an embodiment of the disclosure is illustrated in FIG. 1.

A tip end portion of the tap 1 is made up of a threaded portion 2 that includes a plurality of helical cutting blades provided at an outer circumference and a flute portion 3 that is formed so as to divide the threaded portion 2 in a circumferential direction as illustrated in FIG. 1.

Also, a shank portion 4 is formed continuously from the threaded portion 2 and the flute portion 3 along a central axis O at a rear end portion of the tap 1 similarly to a tap in the related art.

Figure 2:
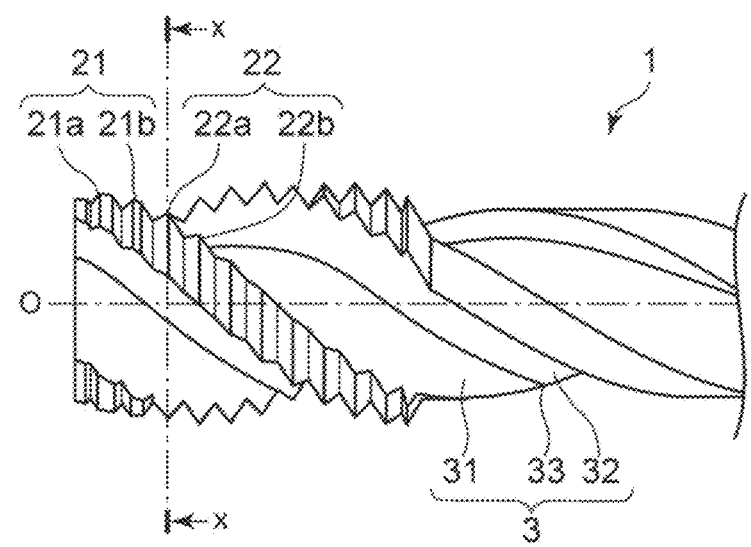
FIG. 2 is an enlarged view of a tip end part of the tap 1 illustrated in FIG. 1.

Next, an enlarged view of the tip end portion of the tap 1 illustrated in FIG. 1 is illustrated in FIG. 2.

The threaded portion 2 of the tap 1 is sectioned into a leading part 21 at the furthest tip end portion of the tap 1 and a complete thread part 22 that continues to the leading part 21 along the central axis O as illustrated in FIG. 2.

A first crest 21a and a second crest 21b are formed at the leading part 21 in this order from the furthest tip end portion of the tap 1 in FIG. 2.

A first crest 22a, a second crest 22b and the other threads are formed at the complete thread part 22 in this order from the leading part 21.

In addition, the flute portion 3 is sectioned into a first flute 31, a second flute 32, and a ridge line portion 33 that is a boundary part between these two flutes 31 and 32 as illustrated in FIG. 2.

Figure 3:
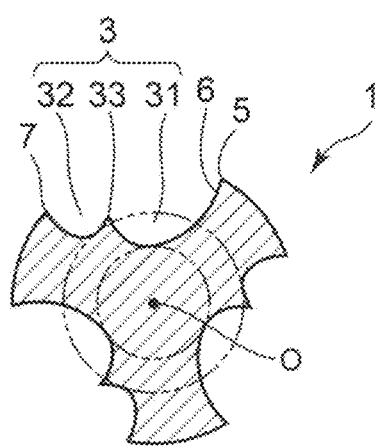
FIG. 3 is a sectional view of the tap 1 illustrated in FIG. 1 at the position of the line X-X.
Figure 4:
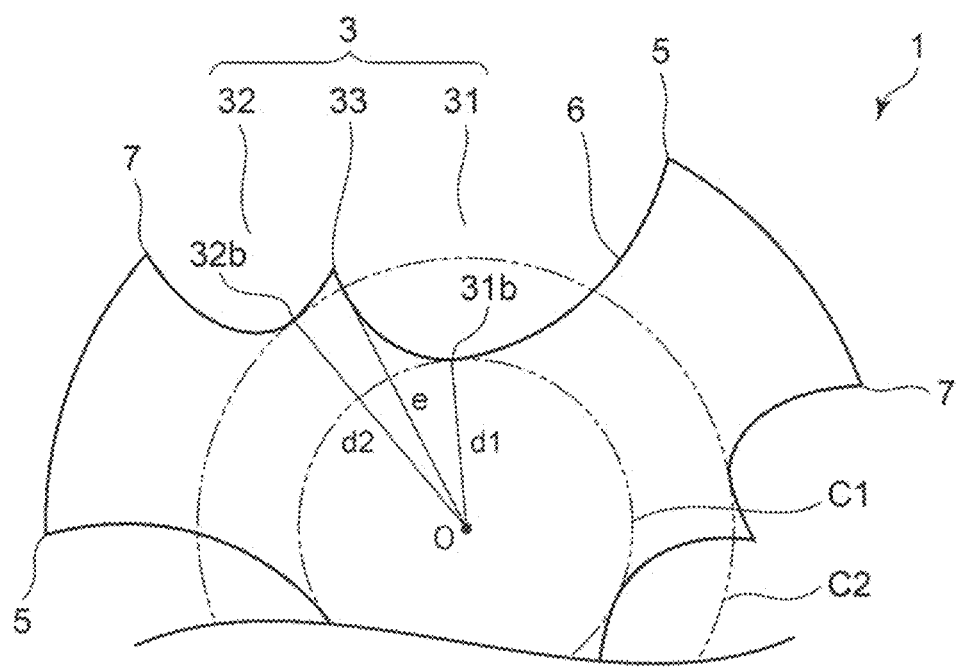
FIG. 4 is a partially enlarged view of the surroundings of a flute portion 3 illustrated in FIG. 3.

A sectional view of the tap 1 illustrated in FIG. 1 at the position of the line X-X is illustrated in FIG. 3, and a partial enlarged view of the surroundings of the flute portion 3 illustrated in FIG. 3 is illustrated in FIG. 4.

In the embodiment of the tap 1 illustrated in FIG. 1, the tap 1 is a so-called three-flute spiral tap in which flute portions (spiral flutes) 3 are formed at three locations in the circumferential direction around the central axis O at the center as illustrated in FIG. 3.

The flute portion 3 is roughly formed of the first flute 31, the second flute 32, and the ridge line portion 33 as illustrated in FIGS. 3 and 4 as described above.

The first flute 31 is a flute that is formed continuously from the cutting blade 5 of the threaded portion 2 and that forms a rake face 6 as illustrated in FIG. 4.

The second flute 32 is a flute that continues to the first flute 31 via the ridge line portion 33, which will be describe later, and that forms a heel 7.

In other words, the second flute 32 and the first flute 31 are aligned in this order along a rotational direction (a counterclockwise direction in FIG. 4) of the tap 1.

The ridge line portion 33 is a boundary part that is formed by a curved surface that forms the first flute 31 and a curved surface that forms the second flute 32 intersecting one another and is formed into a shape projecting outward in a radial direction in a cross-sectional view of the tap 1 as illustrated in FIGS. 3 and 4.

In comparison between the flute depths of the first flute 31 and the second flute 32, that is, in comparison between the distances from the outer circumferential surface of the tap 1 to the flute bottoms 31b and 32b of the respective flutes 31 and 32, the depth of the flute bottom 31b of the first flute 31 is deeper than the depth of the flute bottom 32b of the second flute 32 as illustrated in FIGS. 3 and 4.

In other words, in a case in which the respective distances d1 and d2 from the central axis O of the tap 1 to the respective flute bottoms 31b and 32b of the first flute 31 and the second flute 32 are compared with each other, the distance d1 from the central axis O to the flute bottom 31b of the first flute 31 is shorter than the distance d2 from the central axis O to the flute bottom 32b of the second flute 32 as illustrated in FIG. 4.

Here, the flute bottom 31b of the first flute 31 is a contact point between an imaginary circle C1 (illustrated by a two-dotted chain line) around the central axis O of the tap 1 at the center and an outline (curved surface) that forms the first flute 31 as illustrated in FIG. 4.

Similarly, the flute bottom 32b of the second flute 32 is also a contact point between an imaginary circle C2 (illustrated by a two-dotted chain line) around the central axis O at the center and an outline (curved surface) that forms the second flute 32 as illustrated in FIG. 4.

Also, the imaginary circle C1 indicates a web thickness of the tap 1.

Further, a distance "e" from the central axis O of the tap 1 to the ridge line portion 33 is longer than the distance d1 from the central axis O to the flute bottom 31b of the first flute 31 and is longer than the distance d2 from the central axis O to the flute bottom 32b of the second flute 32 as illustrated in FIG. 4.

Next, a clearance of the heel in the tap according to the embodiment will be described.

Figure 5:
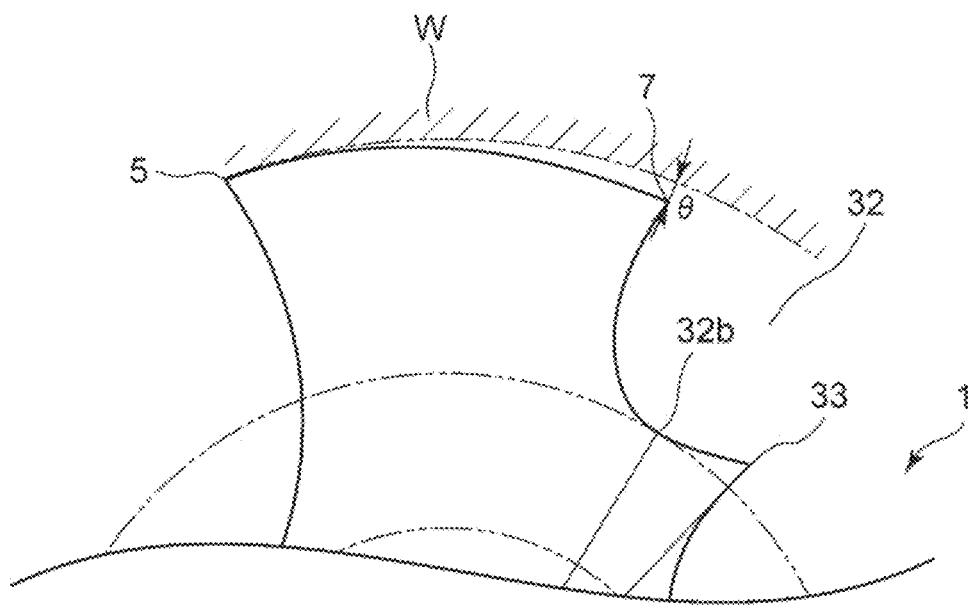
FIG. 5 is an enlarged view for explaining a positional relationship between the tap 1 and a work material W at the time of cutting working.

An enlarged view of the tap 1 and an inner circumferential surface of a work material W during cutting working using the tap 1 according to the embodiment are illustrated in FIG. 5.

A clearance (a clearance for a thread) is present between the tap 1 and the inner circumferential surface of the work material W as illustrated in FIG. 5.

As for the amount of clearance, a clearance angle $\theta$ of the leading part 21 is less than 2°.

With the clearance angle $\theta$ of less than 2°, it is possible to prevent chips from entering the threaded portion 2 (a gap between the tap 1 and the work material W) from the second flute 32 even in a case in which chips are present in the second flute 32.

In addition, although the case in which the flute portion 3 of the tap 1 is a spiral flute (spiral) is described in the embodiment illustrated in FIG. 1, the tap 1 according to the embodiment may have the flute portion 3 formed as a straight flute (straight).

By forming the flute portion 3 of the tap 1 according to the embodiment as a spiral flute, it is possible to cause chips to remain in the first flute 31 and to prevent the chips from entering the second flute 32 even in a case of a form in which chips generated during tapping are divided, as in a case in which the work material W is titanium alloy or the like.

In other words, since the chips generated during tapping are prevented from entering the second flute 32 of the tap 1, an effect of preventing the chips from entering the threaded portion 2 from the heel 7 of the tap 1 and preventing biting between the chips and the tap 1 when the tap 1 is rotated inversely and is pulled out after tapping is achieved.

Test 1

In order to check cutting performance depending on the flute (section) shape of the tap and the clearance angle of the leading part, a tap cutting working test was conducted using titanium alloy (Ti-6Al-4V) as a work material.

Results of the test will be described with reference to drawings.

In the test, a total of three types of tap (M9) including a tap according to the embodiment as illustrated in FIG. 1 and the like (hereinafter, referred to as an "embodiment product 1") as well as two taps as taps in the related art (hereinafter, referred to as a "conventional product 1" and a "conventional product 2", respectively) were used.

Figure 6:
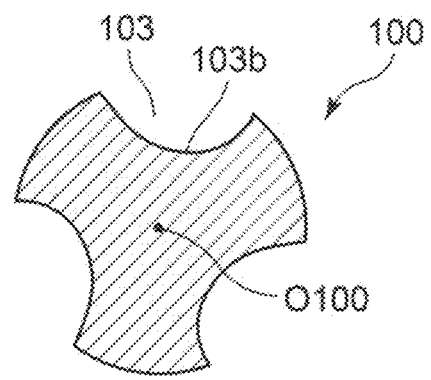
FIG. 6 is a sectional view of a product in the related art (conventional product) 1 (tap 100) that was used in Test 1.
Figure 7:
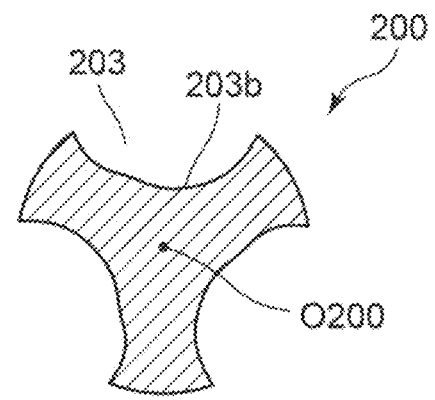
FIG. 7 is a sectional view of a product in the related art 2 (tap 200) that was used in Test 1.

A schematic sectional view of a tap 100 illustrating a flute form of the conventional product 1 used in the test is illustrated in FIG. 6, and a schematic sectional view of a tap 200 illustrating a flute form of the conventional product 2 is illustrated in FIG. 7.

As illustrated in FIGS. 6 and 7, although the conventional product 1 and the conventional product 2 had a common point that the flute portions were substantially similar to that of an ordinary tap, the depth of a flute 203 of the conventional product 2 (tap 200) was deeper than a flute 103 of the conventional product 1 (tap 100).

In other words, the distance from a center O100 of a web thickness in the tap 100 (conventional product 1) to a flute bottom 103b is longer than the distance from a center O200 of a web thickness in the tap 200 (conventional product 2) to a flute bottom 203b.

Specifications of the three types of tap used in the test are illustrated in Table 1.

TABLE 1

|  | Conventional product 1 | Conventional product 2 | Invention product 1 |
|---|---|---|---|
| Rake angle (°) | 4 | 8 | 8 |
| Helix angle (°) | 10 | 15 | 15 |
| Web thickness (mm) | 4.8 | 3.74 | 3.74 |
| Clearance angle of leading part (°) | 2 | 1.5 | 1.5 |
| Number of lead threads at leading part |  |  | 2 and a half |

Forms of chips discharged from the respective taps after the cutting working test was conducted using the aforementioned three types of tap are illustrated in FIGS. 8 to 13.

Figure 8:
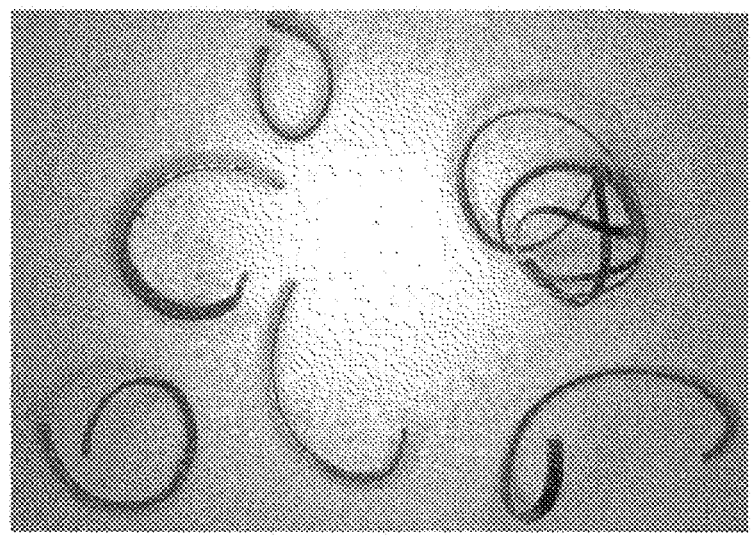
FIG. 8 is a photograph illustrating chips (long ones) generated from a product according to the embodiment (embodiment product) 1 in Test 1.
Figure 9:
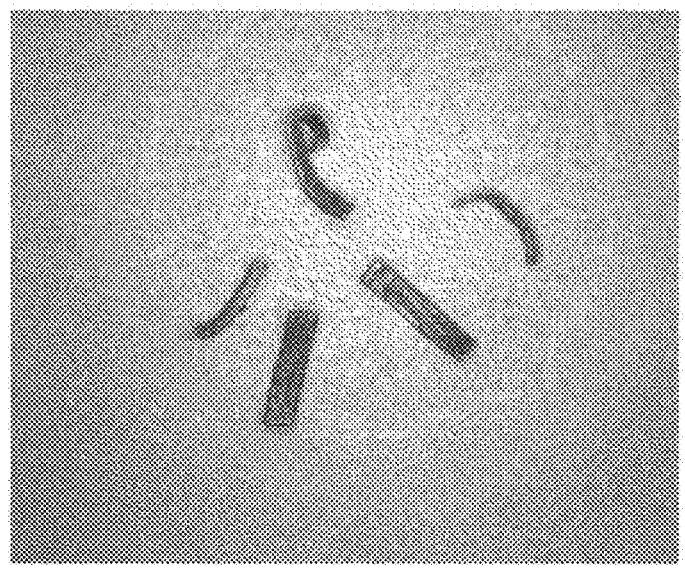
FIG. 9 is a photograph illustrating chips (short ones) generated from the embodiment product 1 in Test 1.

Among the chips discharged from the embodiment product 1, chips with long chip lengths are illustrated in FIG. 8, and chips with short chip lengths are illustrated in FIG. 9.

Figure 10:
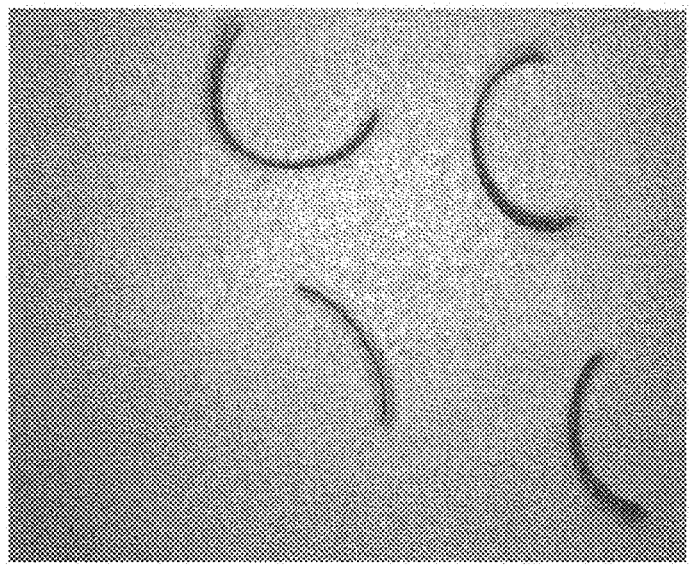
FIG. 10 is a photograph illustrating chips (long ones) generated from the conventional product 1 in Test 1.
Figure 11:
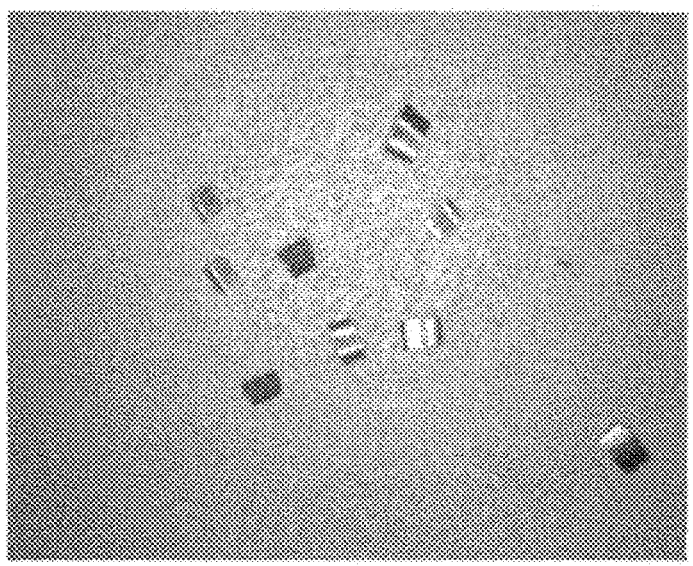
FIG. 11 is a photograph illustrating chips (short ones) generated from the conventional product 1 in Test 1.
Figure 12:
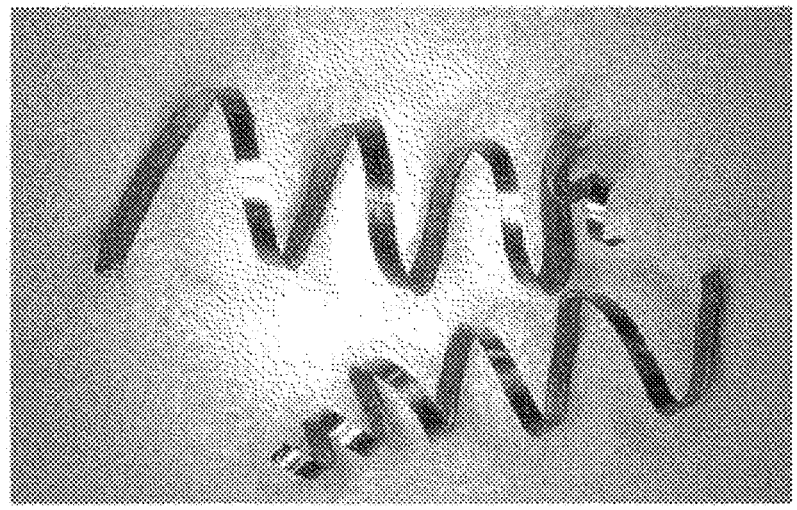
FIG. 12 is a photograph illustrating chips (long ones) generated from the conventional product 2 in Test 1.
Figure 13:
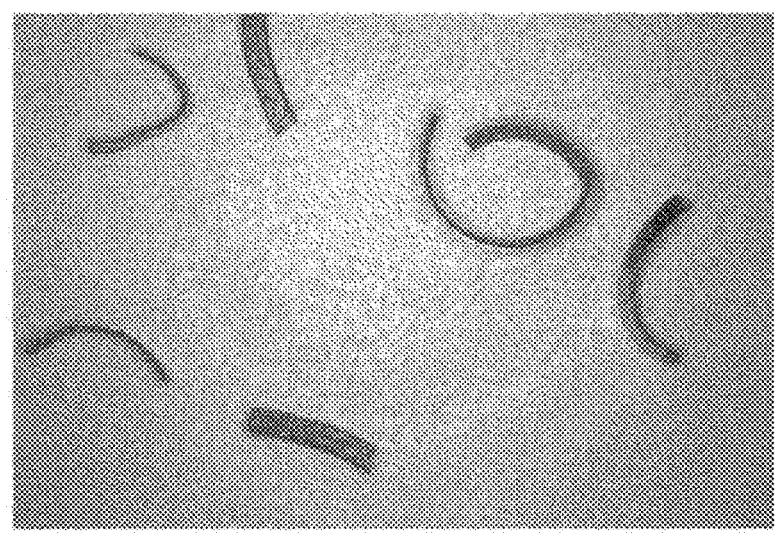
FIG. 13 is a photograph illustrating chips (short ones) generated from the conventional product 2 in Test 1.

Similarly, forms of chips discharged from the conventional product 1 after the cutting test are illustrated in FIG. 10 (long chips) and FIG. 11 (short chips), and forms of chips discharged from the conventional product 2 are illustrated in FIG. 12 (long chips) and FIG. 13 (short chips), respectively.

In comparison of the long chips generated from the three types of tap as a result of conducting the cutting working test using the three types of tap, the chips generated in the cutting working using the embodiment product 1 and the conventional product 1 were in helical shapes rolled once or twice as illustrated in FIGS. 8 and 10.

Meanwhile, the long chips generated in the cutting working using the conventional product 2 were in a form in which the chips were rolled several times in helical shapes as illustrated in FIG. 12.

If the chips in the form illustrated in FIG. 12 are generated during cutting working, this may be a cause of the flute portion of the tap clogging with the chips.

Next, forms of the short chips generated from the aforementioned three types of tap will be compared.

Forms of the chips generated in the cutting working using the embodiment product 1 and the conventional product 2 were curled (arc) shapes without being divided into small pieces as illustrated in FIGS. 9 and 13.

Meanwhile, the form of the chips generated in the cutting working using the conventional product 1 was a form in which the chips were divided into small pieces as illustrated in FIG. 11.

If the chips in the form illustrated in FIG. 11 are generated during the cutting working, small chips enter the threaded portion from the heel of the tap by the tap being rotated inversely after the cutting working, and this may be a cause of sticking (galling) between the tap and the work material.

The fact that the chips generated in the cutting working were discharged in the form in which the chips were rolled several times in helical shapes or in the form in which the chips were divided into small pieces regardless of the depth of the flute if the flute forms were those of the taps of the conventional products 1 and 2 in the case in which the work material was titanium alloy was discovered from the test results described above.

Meanwhile, the fact that the chips generated in the cutting working had appropriate lengths by dividing a flute in a one-flute form into a plurality of flutes and setting the depth of one flute to be deeper than the flute depth of the other as in the embodiment product 1 was discovered.

Test 2

Next, a tap cutting working test was conducted in order to check a relationship between the number of lead threads (the number of threads) at the leading part of the tap and cutting performance.

Results of the test will be described with reference to drawings.

In Test 2, the same form as that of the embodiment product 1 used in the previous Test 1 was employed, and two types of tap, namely a tap including threads, the number of which is to two and a half, at a leading part (embodiment product 1) and a tap including threads, the number of which was reduced to one and a half, at a leading part (hereinafter, referred to as a "comparative product 1") were used.

In Test 2, tapping was conducted on a work material for a total of fifty holes using the two types of tap of the embodiment product 1 and the comparative product 1, and forms of chips discharged from the respective taps were checked.

Also, dimension check using gauges was also conducted on the worked tapped holes.

As the gauges used here, two types of gauges, namely a gauge (so-called passing plug gauge) for checking that insertion up to a predetermined position was able to be achieved when a screw was screwed into a tapped hole while being rotated and a gauge (so-called stopping plug gauge) for checking that insertion beyond a predetermined position (two turnings) was not able to be achieved when a screw was screwed into a tapped hole while being rotated were used to conduct dimension checking of the tapped holes.

Chips generated from both the embodiment product 1 and the comparative product 1 in the test had arc shapes as illustrated in FIGS. 8 and 9 similarly to the test results of Test 1 and were formed to have substantially constant lengths.

Also, in the dimension checking for the tapped holes after the cutting working using the gauges, no problems were observed in the tapped hole dimension checking conducted on a total of fifty tapped holes worked with the embodiment product 1 using the aforementioned two types of gauges.

However, a large resistance was felt before the passing plug gauge was inserted up to the predetermined position in the fourth hole and the fifth hole counted from the first hole, from which the dimension checking using the gauge was started, in regard to the tapped holes worked using the comparative product 1.

Therefore, the gauge was not further inserted, and the result of the dimension checking for the tapped holes was determined to be a "failure".

Also, the dimension checking of the sixth and the following tapped holes was ended at this point from the viewpoint of preventing a threaded portion of the gauge from being damaged.

On the basis of the aforementioned test results, the number of lead threads of the tap has is preferably at least equal to or greater than two in order to secure the tapped hole dimension in accordance with Japanese Industrial Standards (JIS B0205) for tapped holes.

Since the tap according to the disclosure can curb biting of chips divided after tapping in the tap, and the tap can be thus widely applied to tapping on a work material with relatively low ductility.

What is claimed is:

1. A tap comprising:
    a threaded portion that has a cutting blade on an outer circumferential surface of the threaded portion;
    a flute portion that is formed so as to divide the threaded portion in a circumferential direction; and
    a shank portion that is formed continuously from the threaded portion and the flute portion along a central axis,
    wherein the flute portion includes, in a cross-sectional view,
        a first flute that is formed continuously from the cutting blade of the threaded portion,
        a second flute that is formed continuously from the first flute, and
        a ridge line portion that is a boundary between the first flute and the second flute, and
    a distance from the central axis to the ridge line portion is longer than a distance from the central axis to a flute bottom of the first flute and is longer than a distance from the central axis to a flute bottom of the second flute,
    the distance from the central axis to the flute bottom of the first flute is shorter than the distance from the central axis to the flute bottom of the second flute.

2. The tap according to claim 1,
    wherein the threaded portion has a leading part and a complete thread part along the central axis, and
    a clearance angle of the leading part is less than 2°.

3. The tap according to claim 2, wherein the number of threads at the leading part is equal to or greater than two.

4. The tap according to claim 2, wherein the flute portion is a spiral flute.

5. The tap according to claim 1,
    wherein the threaded portion has a leading part and a complete thread part along the central axis, and
    the number of threads at the leading part is equal to or greater than two.

6. The tap according to claim 5, wherein the flute portion is a spiral flute.

7. The tap according to claim 1, wherein the flute portion is a spiral flute.

* * * * *